(12) United States Patent
Mizuno

(10) Patent No.: US 7,936,963 B2
(45) Date of Patent: May 3, 2011

(54) VIDEO REPRODUCTION APPARATUS

(75) Inventor: Hiroshi Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1407 days.

(21) Appl. No.: 11/411,500

(22) Filed: Apr. 26, 2006

(65) Prior Publication Data

US 2006/0245726 A1   Nov. 2, 2006

(30) Foreign Application Priority Data

Apr. 28, 2005   (JP) ................................ P2005-132844

(51) Int. Cl.
*H04N 9/80* (2006.01)
(52) U.S. Cl. ..................... 386/240; 386/241; 386/369
(58) Field of Classification Search ............... 386/94–96, 386/125–126
See application file for complete search history.

(56) References Cited

U.S. PATENT DOCUMENTS 5,822,314 A * 10/1998 Chater-Lea .................... 370/337
6,453,119 B1 * 9/2002 Maruyama et al. ............. 386/95
6,741,798 B2 * 5/2004 Maruyama et al. ............. 386/95

FOREIGN PATENT DOCUMENTS

| JP | 2002 223411 | 8/2002 |
|---|---|---|
| JP | 2003 242037 | 8/2003 |
| JP | 2003-244674 | 8/2003 |
| JP | 2004 179823 | 6/2004 |

* cited by examiner

*Primary Examiner* — Jamie Atala
(74) *Attorney, Agent, or Firm* — Frommer Lawrence & Haug LLP; William S. Frommer; Thomas F. Presson

(57) ABSTRACT

A video reproduction apparatus sequentially reads out video information from an information storage unit for reproduction, whereby the apparatus is capable of determining from which position in which file reproduction is resumed when a system is recovering from an unexpected power interruption. The apparatus reproduces a reproduction video to be displayed on a display section under an environment where many people enjoy viewing video pictures. The apparatus further includes an information storage section which stores video information corresponding to one or more titles in the form of a plurality of files having different data amounts from one another; a reproduction section which reproduces video information stored, in the form of a plurality of files, in the information storage section; and a reproduction information storage section which stores reproduction information which is auxiliary information related to reproduced video information that has been reproduced by the reproduction section.

6 Claims, 12 Drawing Sheets

VIDEO REPRODUCTION APPARATUS

CROSS REFERENCE TO RELATED APPLICATIONS

The present invention contains subject matter related to Japanese Patent Application JP 2005-132844 filed in Japanese Patent Office on Apr. 28, 2005, the entire content of which being incorporated herein by reference.

BACKGROUND OF THE INVENTION

1. Field of the Invention

The present invention relates to a video reproduction apparatus which is used under an environment, such as a movie-theater, where many people enjoy viewing video pictures and which reads out video information from an information storage unit to sequentially reproduce the video information so as to transmit the video information to a display apparatus.

2. Description of the Related Art

A digital cinema has gotten a lot of attention recently. In the digital cinema, digital video information for cinema content is processed as follows: The digital video information is physically distributed or electrically distributed via a network or the like in the form of digital content; Recorded in a large-capacity information storage unit including a plurality of HDDs having an array structure; Sequentially read out to a video reproduction apparatus from the large-capacity information storage unit so as to be reproduced by the video reproduction apparatus; Supplied to a reflective projector or transmissive projector; and Projected on a screen by the projector.

Further, as described in Jpn. Pat. Appln. Laid-Open Publication No. 2003-244674, a system for distributing a digital cinema to a plurality of cinema-systems has become necessary, and a digital cinema system that uses, in general, a LAN to connect the cinema systems and connect installations provided in a theater, such as video/audio or illuminating equipment, that constitute each cinema system is proposed.

In a conventional theater where a movie is shown using a film, video information corresponding to about two hours is not recorded in one roll of film, but divided into a plurality of units called "Reels" depending on the storyline in units of time such as 10 or 20 minutes for easy handling, and the plurality of Reels are set in a cinema projector.

If a trouble such as accidental power interruption occurs, screening can be resumed by reproducing a film from the vicinity of the position subsequent to the reproduced position in the Reel after the failure has been recovered.

In a digital content reproduction apparatus for personal use, reproduction is resumed from the position subsequent to the reproduced position. A disc reproduction apparatus and the like have an ID of an optical disc, and when a first optical disc whose ID has already been retained in the disc reproduction apparatus is inserted thereto after a second disc has been inserted and ejected, reproduction of the first optical disc can be resumed from the reproduction position that has been stored in the disc reproduction apparatus using its ID.

Further, in the digital content reproduction apparatus for private use, it is possible to associate a reproduction resuming position with the last date and time when the content was reproduced. In addition, reproduction can be resumed from the scene immediately before the last reproduction position.

SUMMARY OF THE INVENTION

However, the above conventional techniques cannot cope with accidental power interruption occurring in the digital cinema. Also in the digital cinema, for easy handling, transfer of the video information is performed in units of files, each called "Reel", having different data amount from one another. Therefore, it is impossible for the conventional technique to determine the reproduction position within a file at the time when the power interruption has ended.

The present invention has been made in view of the above situation, and it is desirable to provide a video reproduction apparatus capable of determining from which position in which file reproduction is resumed at the time when a system is recovered from power interruption.

To solve the above problems, according to the present invention, there is provided a video reproduction apparatus, including: an information storage section which stores video information corresponding to one or more titles in the form of a plurality of files having different data amount from one another; a reproduction section which reproduces video information stored, in the form of a plurality of files, in the information storage section; and a reproduction information storage section which stores reproduction information which is auxiliary information related to reproduced video information that has been reproduced by the reproduction section; wherein the video reproduction apparatus reproduces a reproduction video to be displayed on a display section under an environment where many people enjoy viewing video pictures to transmit the reproduction video to the display section.

In the video reproduction apparatus, the reproduction section refers to plurality of offset information which are included in the reproduction information stored in the reproduction information storage section and which are appended for separating the video information within each file to determine a reproduction resuming position on video information.

In the video reproduction apparatus, it is preferable that the reproduction section read out, as the reproduction information, a file name of a file that was being reproduced and a frame number of a separate section that was being reproduced from the reproduction information storage section and acquire offset information based on the file name and frame number to determine the reproduction resuming position on the video information. Further, it is preferable that the reproduction section round down the offset information to acquire the top position of the video information frame and determine the acquired top position as the reproduction resuming position.

When performing resume reproduction, the reproduction section opens a file based on a current Reel number read out from the reproduction information storage section, refers to plurality offset information which are appended for separating the video information within each file based on a transfer amount read out from the reproduction information storage section, performs seek by the amount required for resume reproduction, and reproduces the video information.

There is available user set information related to automatic restoration, which indicates whether the automatic restoration is performed or not, as the reproduction information. When the automatic restoration is specified in the user set information, the reproduction section performs resume reproduction.

There is available user set information related to automatic restoration, which indicates whether the automatic restoration is performed or not, as the reproduction information. When the automatic restoration is not specified in the user set information, the reproduction section resumes reproduction under the control of an externally connected reproduction operation section.

The reproduction section notifies the reproduction operation section of the reproduction information, and the reproduction operation section determines whether reproduction can promptly be resumed or not based on the reproduction information. When determining that reproduction can promptly be resumed, the reproduction operation section allows the reproduction section to perform the resume reproduction. When determining that reproduction cannot promptly be resumed, the reproduction operation section allows the reproduction section to perfume a manual resume reproduction process.

The reproduction section performs the manual resume reproduction process while returning a response to the reproduction operation section in response to reproduction start position and content information notified from the reproduction operation section and notifying the reproduction operation section of status information.

The video reproduction apparatus according to the present invention refers to plurality of offset information which are included in the reproduction information stored in the reproduction information storage section and which are appended for separating the video information within each file to determine a reproduction resuming position on video information. Therefore, it is possible to determining from which position in which file reproduction is resumed at the time when a system is recovered from unexpected power interruption.

DETAILED DESCRIPTION OF THE PREFERRED EMBODIMENTS

A preferred embodiment of the present invention will be described below. The present embodiment is a video reproduction apparatus which sequentially reads out video information from an information storage unit so as to reproduce it and projects the reproduced video on a screen using a projector under an environment, such as a movie-theater, where many people enjoy viewing video pictures and, more particularly, is a video reproduction apparatus which handles digital video information.

Figure 1:
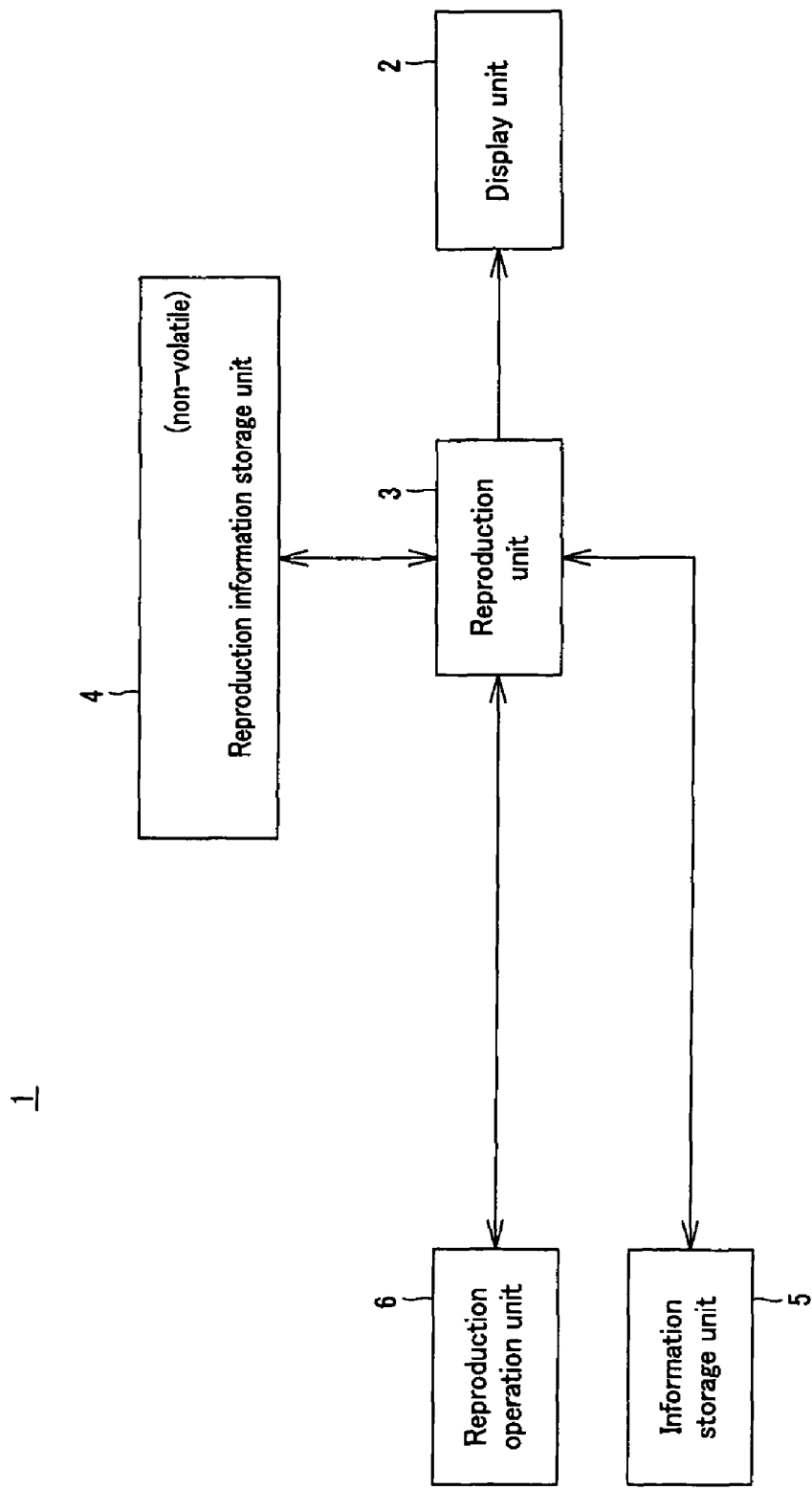
FIG. 1 is a block diagram showing a digital cinema system.

As shown in FIG. 1, in a digital video reproduction apparatus 1, a display unit 2, a reproduction information storage unit 4, an information storage unit 5, and a reproduction operation unit 6 are connected to a reproduction unit 3. The large-capacity information storage unit 5 records digital video information for cinema content physically distributed or electrically distributed via a network or the like in the form of digital content. The reproduction unit 3 sequentially reads out the digital video information from the large-capacity information storage unit 5 so as to reproduce it and supplies the reproduced video to the display unit 2 such as reflective or transmissive projector. The display unit 2 projects the reproduced video on a not shown screen.

The information storage unit 5 includes, for example, a plurality of hard disc drives (HDDs) having an array structure and stores encrypted digital video information as content data. In particular, the information storage unit 5 stores the digital video information as a plurality of files having different data amount from one another. One file is stored in a separate unit called "Reel". Accordingly, data amount of respective Reels are changed depending on the scene.

The reproduction unit 3 decrypts the encryption of the Reel-based digital video information recorded in the information storage unit 5 in an encrypted state and decodes it, as described later. Further, the reproduction unit 3 refers to plurality of offset information which are included in the reproduction information stored in the reproduction information storage unit 4 and which are appended for separating the video information within each file to determine a reproduction resuming position on video information.

The reproduction information storage unit 4 is a non-volatile memory and stores reproduction information which is auxiliary information related to reproduced video information that has already been reproduced by the reproduction unit 3. Although the details are described later, the reproduction information includes a file name indicating a file that was being reproduced and a frame number indicating a separate section of the file that was being reproduced, as well as transfer amount, number of bytes reproduced, number of frames reproduced, and the like.

The reproduction operation unit 6 is a computer in which a ROM, a RAM, an input and output I/F, a communication I/F, and the like are connected to a CPU via a bus and controls operation of the digital video reproduction apparatus 1.

The information storage unit 5 and reproduction operation unit 6 may be connected to each other via the reproduction unit 3 and a network, as described later.

Figure 2:
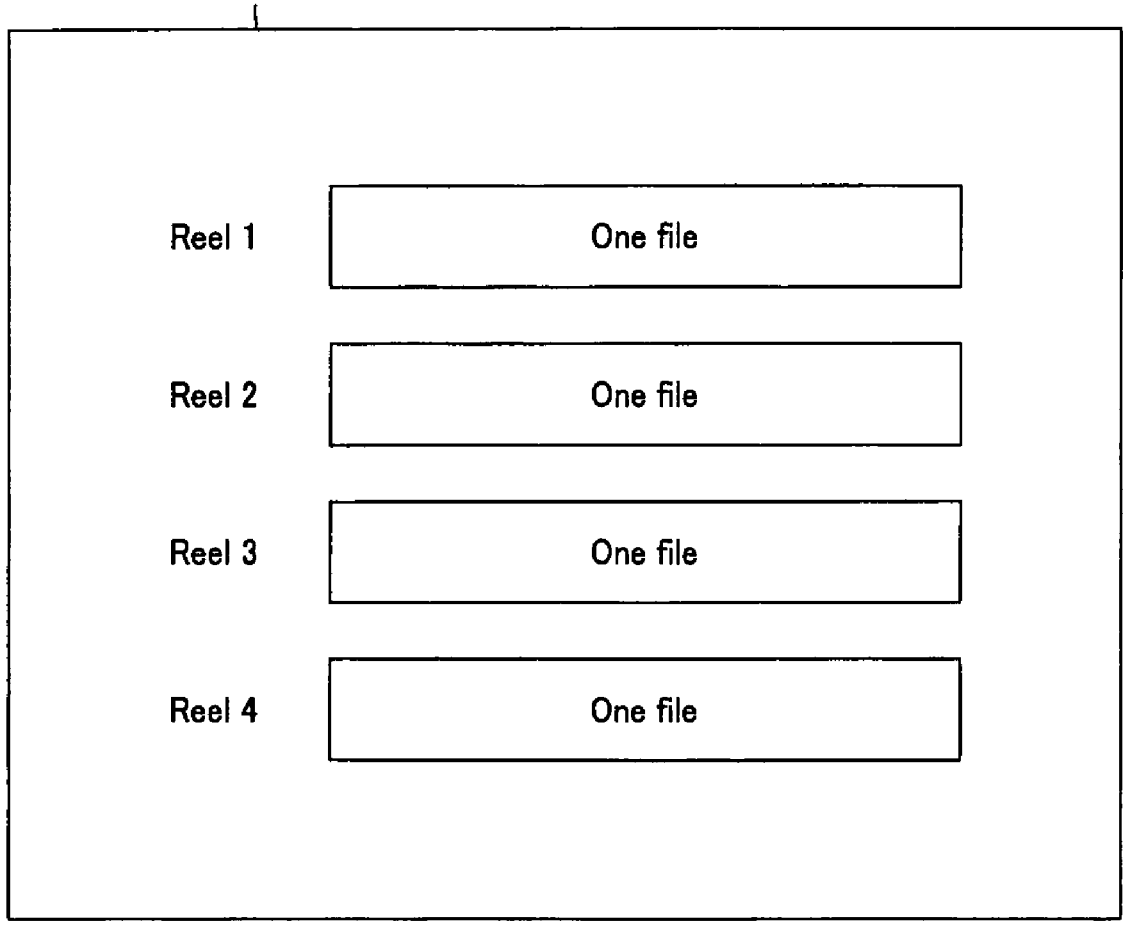
FIG. 2 is a view showing the concept of a Reel.

FIG. 2 is a view showing the concept of a Reel. Assuming that one content 10 extends over a plurality of files in a continuous manner, the individual file is defined as a Reel. In the case where one content includes only one file, one content=one Reel is satisfied. Audio information and video information are constituted as different files in one content, a Reel for audio information and a Reel for video information are assumed to be included in one Reel. Further, in the case where Meta Data information or subtitle information exists as an independent file, it is assumed to be included in one Reel.

A file corresponding to one Reel includes a plurality of frames. Therefore, it is necessary to determine up to which frame of which file reproduction has proceeded and from which frame the reproduction is resumed at the time when a system is recovered from unexpected power interruption.

In the digital video reproduction apparatus 1, the reproduction unit 3 reads out, as the reproduction information, the file name of a file that was being reproduced and frame number of a separate section that was being reproduced from the reproduction information storage unit 4 and obtains offset information based on the file name and frame number to determine the reproduction resuming position on the video information.

Figure 3:
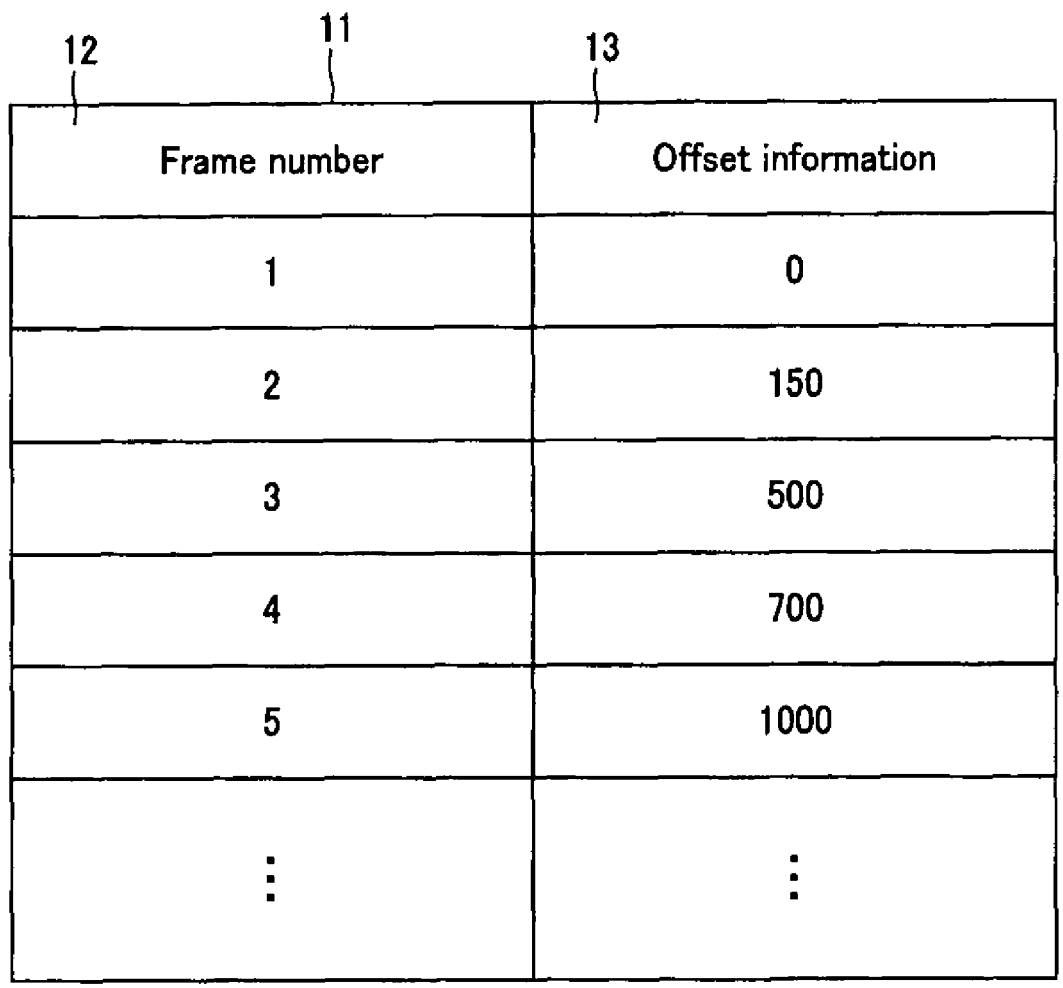
FIG. 3 is a view showing a frame table.

The digital video reproduction apparatus 1 retains a frame table as shown in FIG. 3 in order to specify an arbitrary frame. The table 11 includes a frame number 12 and its corresponding offset information 13. The offset information 13 is information appended to the Reel. The header of the offset information 13 represents the location thereof.

In the table of FIG. 3, numerals 1, 2, 3, 4, 5, . . . are used as the frame number 12 and values 0, 150, 500, 700, 1000 . . . are stored as offset information 13 in association with each frame number 12. When the frame number 12 is 1, corresponding offset information is 0. When the frame number 12 is 2, corresponding offset information is 150. It can be seen from the above that the frame whose frame number 12 is 1 has data of 0 to 149th bytes. When the frame number 12 is 3, corresponding offset information is 500. This shows that the frame whose frame number 12 is 2 has data of 150 to 499th byte. When the frame number 12 is 4, corresponding offset information is 700. This shows that the frame whose frame number 12 is 3 has data of 500 to 699th byte. When the frame number 12 is 5, corresponding offset information is 1000. This shows that the frame whose frame number 12 is 4 has data of 700 to 999th byte.

The offset information 13 is information appended for separate video information in a file, i.e., a Reel. In this case, a unit called "frame" is used to separate the video information.

In the case where the number of frames is increased to exceed the maximum table size, the table is divided into a plurality of parts. This makes it possible to acquire offset information corresponding to an arbitrary frame from the frame number 11.

Figure 4:
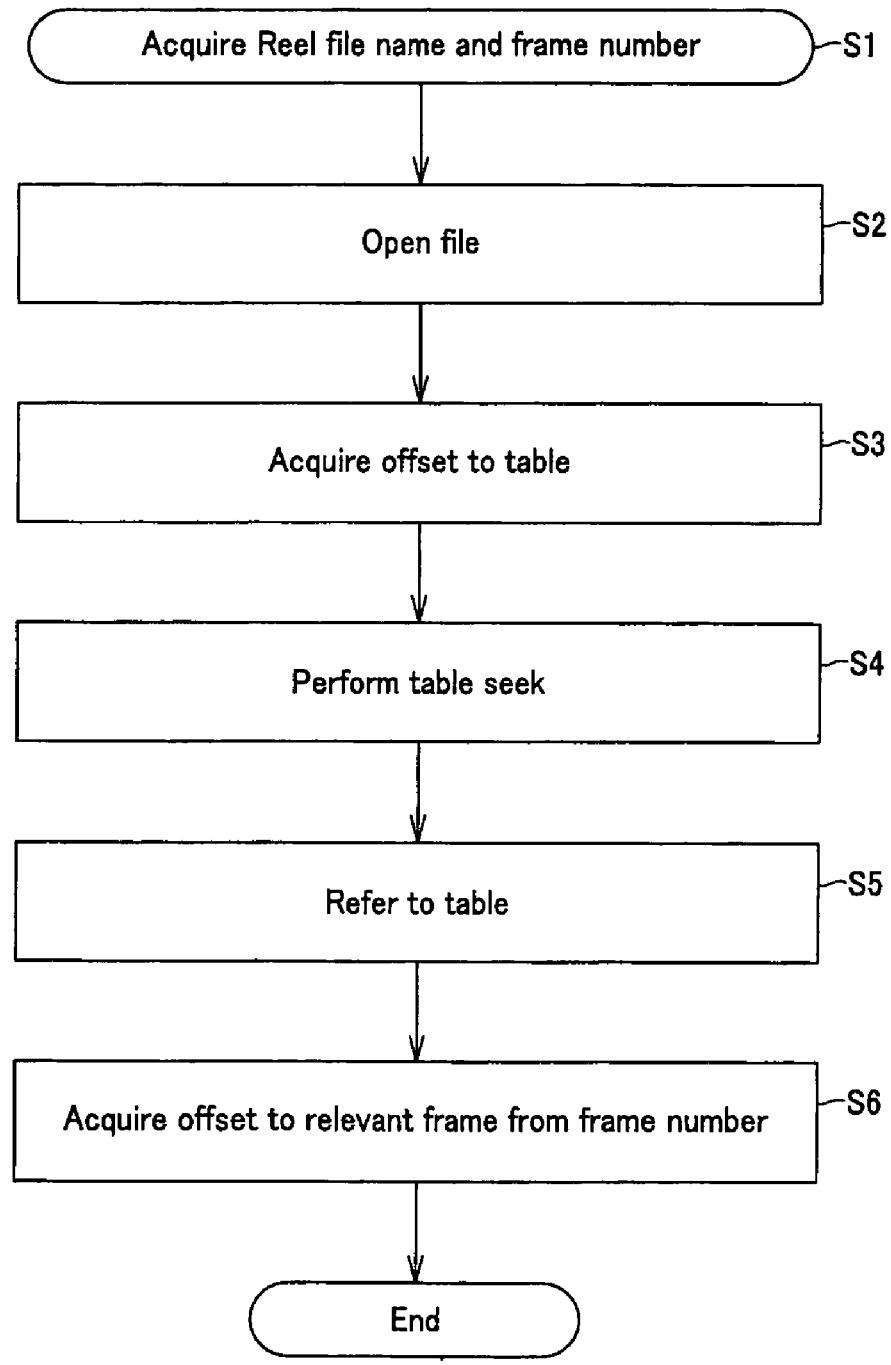
FIG. 4 is a flowchart showing an offset calculation process.

FIG. 4 shows the flow of an offset calculation process performed using the table information. Firstly, a target Reel and frame number that have been read out as the reproduction information are specified (step S1). Then the target file is opened (step S2), and offset to the table is calculated (step S3). Next, seek is performed for the table based on the offset (step S4). The table is then referred to (step S5) and the offset to the relevant frame is obtained from the frame number (step S6). For example, it is possible to determine what number of the total number of frames in e.g., the three Reels the 100th frame of the second Reel corresponds to.

Although the table is retained in the content file in the above description, the table may exist as an independent file. In this case, the above steps S3 (acquisition of offset to the table) and S4 (seek for the table) are omitted and a file in which the table is stored needs to be opened separately.

Figure 5:
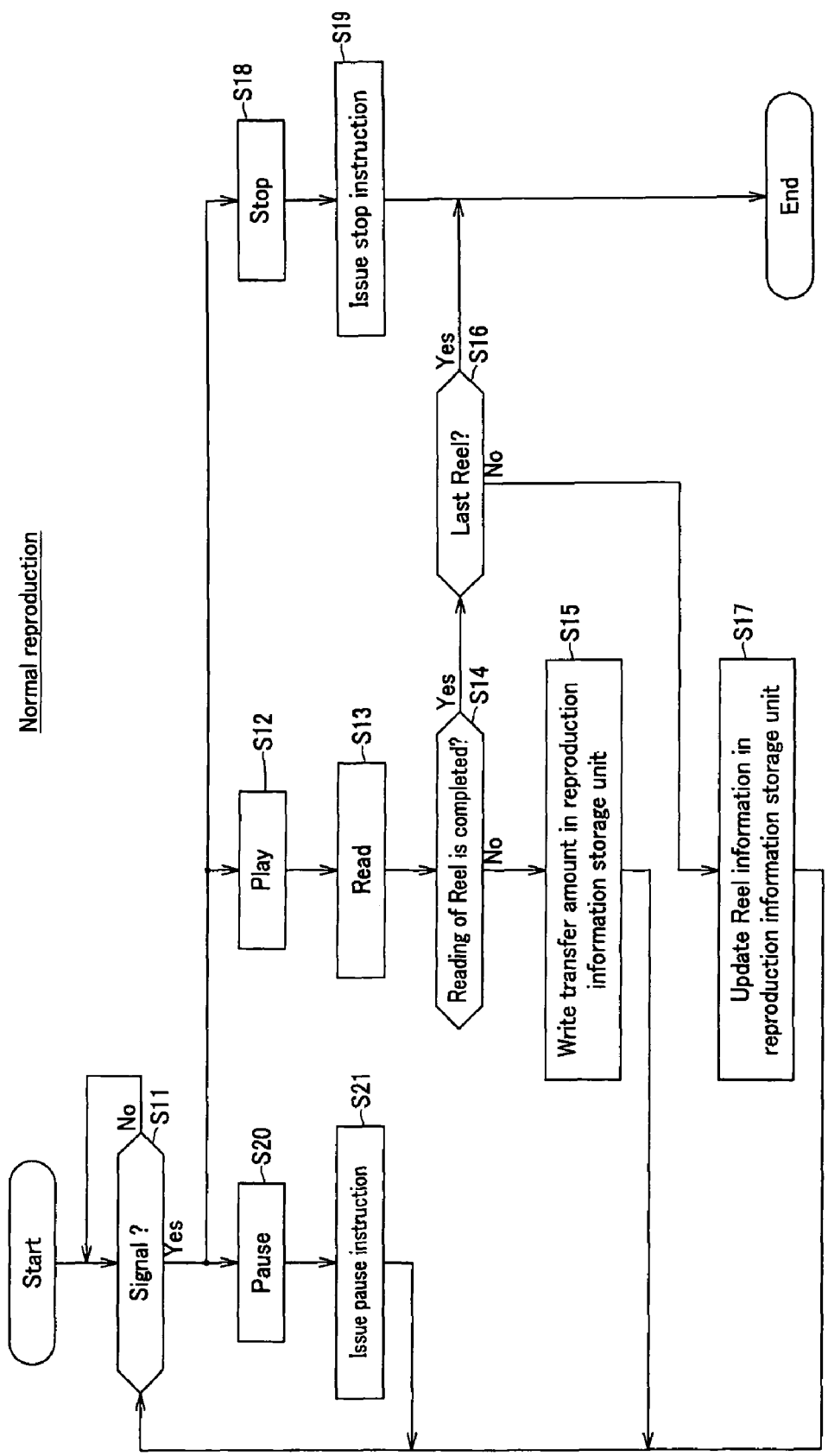
FIG. 5 is a flowchart showing a normal reproduction process.

Next, a procedure of a normal reproduction process for video information performed in the digital video reproduction apparatus 1 will be described with reference to FIG. 5. In this example, the operation is assumed to include Play, Stop, and Pause. However, Fast-forward and Rewind operation may be added and, even in this case, the operation can be performed according to the same procedure. Firstly, in step S11, it is determined that a signal is input from the reproduction operation unit 6 connected to an external device. When the signal is determined to be one that instructs reproduction start, the flow advances to a reproduction operation of step S12. The reproduction operation unit 6 transmits, to the reproduction unit 3, information such as a content ID (information that can uniquely identify the content) indicating the content to be reproduced together with the reproduction start instruction. Upon receiving the instruction and information, the reproduction unit 3 starts reproduction (step S12).

The reproduction unit 3 that has received the reproduction start signal starts reading the content from the locally-connected information storage unit 5 and sequentially performs a later-described decryption or decoding process (step S13). In this content reading process of step S13, the reproduction unit 3 does not read the one entire Reel corresponding to one file shown in FIG. 2, but extracts/reads data from the one Reel in units of, e.g., 32 MB (megabyte), 64 MB, or 128 MB. In step S14, it is checked whether all the data in the one Reel has been read. When a negative result "No" is obtained, i.e., the reading operation has not yet been completed, the flow advances to step S15. In step S15, the reproduction information such as transfer amount or current Reel information is written in the reproduction information storage unit 4, at the same timing when the data that has been read in step S13 is transferred to a device, and retained. The above reproduction information which is auxiliary information related to a reproduced video includes, e.g., information indicating the Reel that was being reproduced, the data amount of the Reel that has been transferred, the number of frames of the Reel that has been transferred, i.e., file name, transfer amount, current Reel number, user set value, and the like. The user set value is a value that defines a setback amount or the number of frames to be set back at the later-described resume reproduction time.

The procedure from steps S12 to S15 is repeated until it has been determined in step S14 that the reading of all the data in the one Reel has been completed. Thus, once reproduction is started in step S12, the reproduction continues unless a signal for switching to another mode is input from the reproduction operation unit 6 in step S11 or the entire content has been reproduced. That is, the loop of Play is repeated until Stop or Pause signal is input or the reproduction of the entire content has been completed.

When it is determined in step S14 that the current reproduction of one Reel has been completed, the flow advances to step S16, where it is checked whether the current Reel is the last Reel or not. When it is determined the current Reel is not the last Reel (NO), the flow advances to step S17, where updated Reel information is written in the reproduction information storage unit 4. When it is determined in step S16 that the current Reel is the last Reel (YES), the procedure of the normal reproduction process is ended. When the content can be transferred in units of frame in the normal reproduction process performed by the reproduction unit 3, it is only necessary to write frame number in the reproduction information storage unit 4. Under an environment where the content cannot be transferred in units of frame, transfer amount needs to be retained as the reproduction information related to the video.

When a stop signal is transmitted from the reproduction operation unit 6 and it is determined that the reproduction unit 3 receives it in step S11, the flow enters a stop process of step S18, and a stop instruction is issued to each part of the reproduction unit 3 in step S19. Similarly, when a pause signal is transmitted from the reproduction operation unit 6 and it is determined that the reproduction unit 3 receives it in step S11, the flow enters a pause process of step S20, and a pause instruction is issued to each part of the reproduction unit 3 in step S21.

A resume reproduction process will next be described with reference to FIG. 6. The resume reproduction denotes resuming the reproduction unit 3 after an unexpected power failure or the like occurs to interrupt power supply to the reproduction unit 3 itself and resuming a reproduction process. That is, in this case, a normal stop operation or shutdown operation is not performed. In this process, the reproduction information (auxiliary information related to reproduced video information) which is written in the reproduction information storage unit 4 in the abovementioned normal reproduction flow is used. As the reproduction information, information including the above mentioned file name, target Reel number, transfer amount (number of frames) or user set value is retained. The user set value is a value indicating whether reproduction is automatically resumed at the restart time without waiting for a signal from the reproduction operation unit and a value indicating a setback amount in the case where reproduction is automatically resumed.

The reproduction unit 3 acquires, in step S31, data of auxiliary information (reproduction information) related to reproduced video information of the video from the reproduction information storage unit 4. In step S32, the reproduction unit 3 opens a file based on a current Reel number. In step S33, the reproduction unit 3 refers to the frame table 11 shown in FIG. 3 and performs seek operation by the amount required for resume reproduction based on the transfer amount of the auxiliary information related to the reproduced video information. That is, based on the transfer amount, with reference to the frame table 11 of FIG. 3, the reproduction unit 3 performs seek operation for the table by a predetermined data amount reproduced immediately before interruption of power supply. The offset calculation process to be performed at this time is as described above with reference to FIG. 4.

Assume that the reproduction unit 3 is restarted after an unexpected power failure or the like occurs, during reproduction of frame number 4 of the current Reel 2 to interrupt power supply to the reproduction unit 3 itself to resume reproduction. At this time, it is assumed that the reproduction unit 3 has written the current Reel number 2 and transfer amount of 720 bytes in the reproduction information storage unit 4 as storage information related to the reproduced video information. Further, it is assumed that the user set value defines that setback position is the top of the currently reproduced frame.

According to the offset calculation process shown in FIG. 4, a target Reel (Reel number 2) and frame number (frame number 4) are specified in step S1. Then the target file is opened (step S2), and offset to the table is calculated (step S3). Next, seek is performed for the table based on the offset (step S4). The table is then referred to (step S5) and the offset "700" to the relevant frame is obtained from the frame number (4) (step S6).

Figure 6:
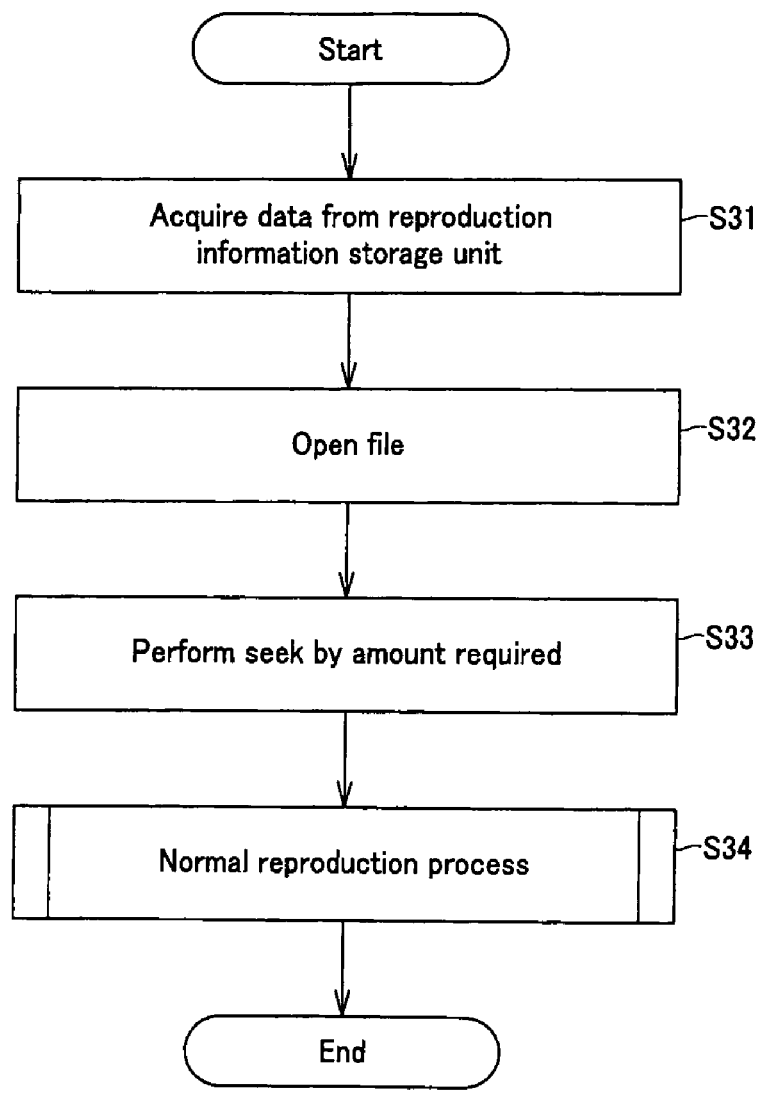
FIG. 6 is a flowchart showing a resume reproduction process.

As a result, in step S33 of FIG. 6, the reproduction unit 3 performs seek by "700" bytes and starts a normal reproduction process from the top of the frame number 4 in step S34.

As described above, when the offset is calculated from the number of frames, it is only necessary to simply referring to the table; on the other hand, when the offset is obtained from the transfer amount, the maximum offset information falling within the transfer amount is used as the offset, thereby allowing reproduction to be resumed from the target frame.

As described above, the user set value is a value indicating whether reproduction is automatically resumed at the restart time without waiting for a signal from the reproduction operation unit and a value indicating a setback amount in the case where reproduction is automatically resumed. In the case where a process that does not use the automatic reproduction start is adopted, a manual resume reproduction function as described below is performed.

Figure 7:
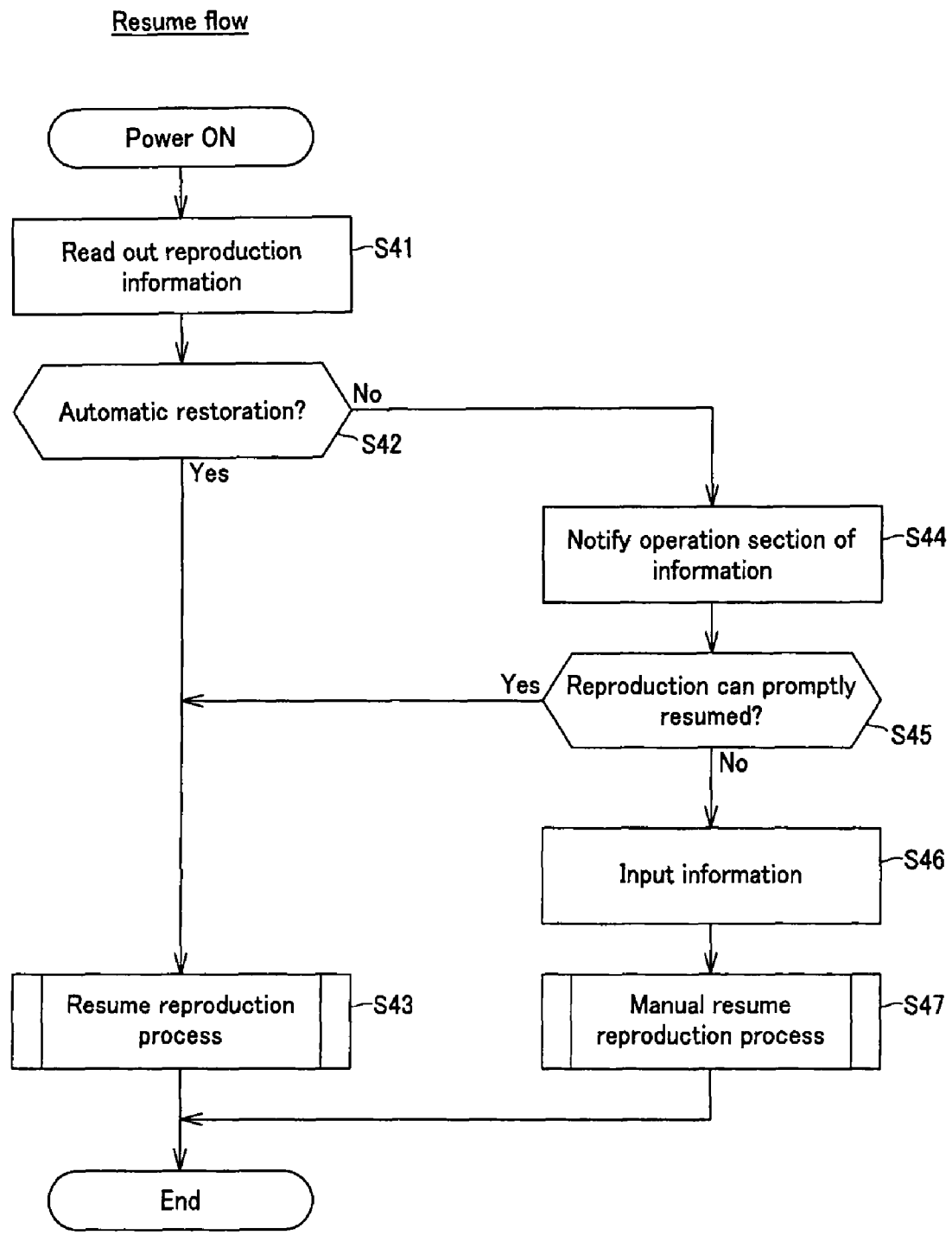
FIG. 7 is a flowchart showing a resume process.

FIG. 7 shows a procedure of a resume process performed in both the case where the user set value indicates that the automatic reproduction start is to be performed and where the user set value indicates that the automatic reproduction start is not performed. It is assumed that, after an unexpected power failure or the like occurs to interrupt power supply to the reproduction unit 3 itself, power is turned ON to allow the reproduction unit 3 to be restarted to thereby resume reproduction. In step S41, the reproduction unit 3 acquires data of auxiliary information related to the reproduced video information of the video from the reproduction information storage unit 4. When determining in step S42 that the automatic restoration is not performed according to the user setting, the reproduction unit 3 advances to step S44. The above determination of execution or non-execution of the automatic restoration made in step S42 is, in other words, a determination allowing or denying the intervention of the reproduction operation unit 6. In the case where the automatic restoration is not performed, the intervention of the reproduction operation unit 6 is allowed to resume reproduction under the control of the reproduction operation unit 6. Therefore, in step S44, the auxiliary information related to the reproduced video information is notified to the reproduction operation unit 6. In this case, the auxiliary information includes information indicating a Reel that is being transferred, the transfer amount of the Reel, and the like. In step S45, the reproduction operation unit 6 checks whether reproduction can promptly be resumed or not. When it is determined that reproduction can promptly be resumed, the flow advances to step S43 and the resume reproduction process described with reference to FIG. 6 is performed. On the other hand, when determining that reproduction cannot promptly be resumed (NO) in step S45, the reproduction operation unit 6 allows an operator to set the position to be reproduced (e.g., from top of the Reel or frame, from scratch, or from a position that was being reproduced at the power failure time) in step S46. After that, in step S47, a later-described manual resume reproduction process is performed.

Figure 8:
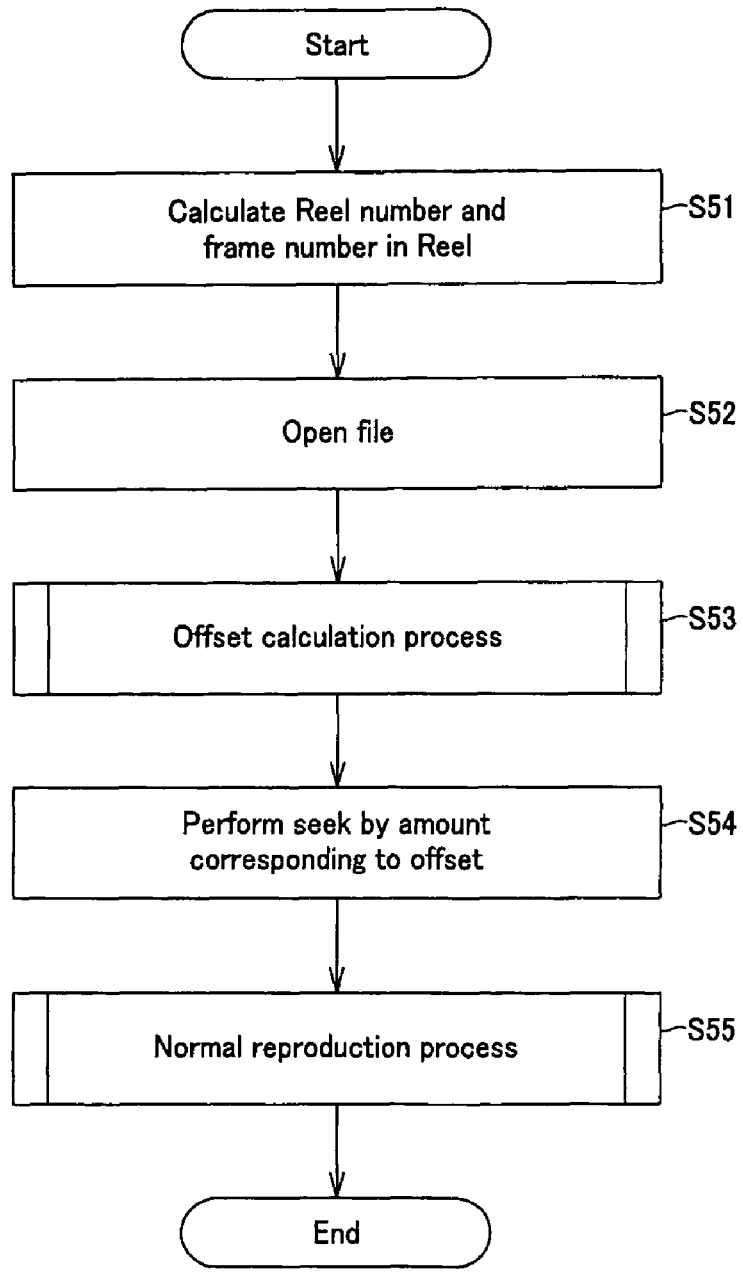
FIG. 8 is a flowchart showing a manual resume reproduction process.
Figure 9:
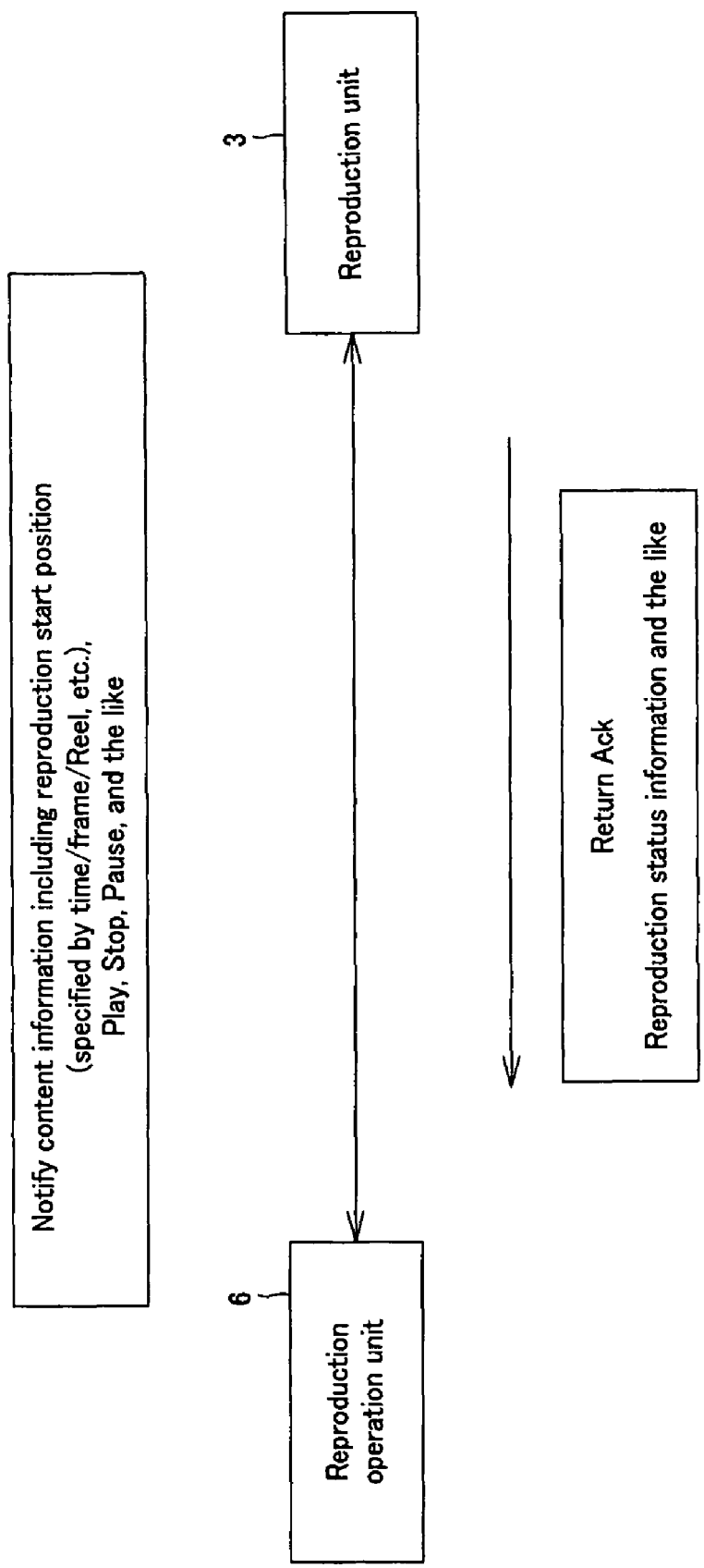
FIG. 9 is a view showing control and data communication between the reproduction operation unit and digital video reproduction apparatus.

FIG. 8 is a flowchart showing a procedure of the manual resume reproduction process. As shown in FIG. 9, the reproduction unit 3 performs the manual resume reproduction process procedure while returning a response Ack in response to content information including reproduction start position (specified by time/frame/Reel, etc.), Play, Stop, Pause, and the like notified from the reproduction operation unit 6 and notifying the same of reproduction status information and the like.

In step S51, the reproduction unit 3 calculates a Reel number and a frame number in the Reel based on the notified information. The reproduction unit 3 opens a corresponding file in step S52, performs the offset calculation process shown in FIG. 4 in step S53, and performs seek by the amount corresponding to the calculated offset in step S54. After that, in step S55, the normal reproduction process shown in FIG. 5 is performed.

Figure 10:
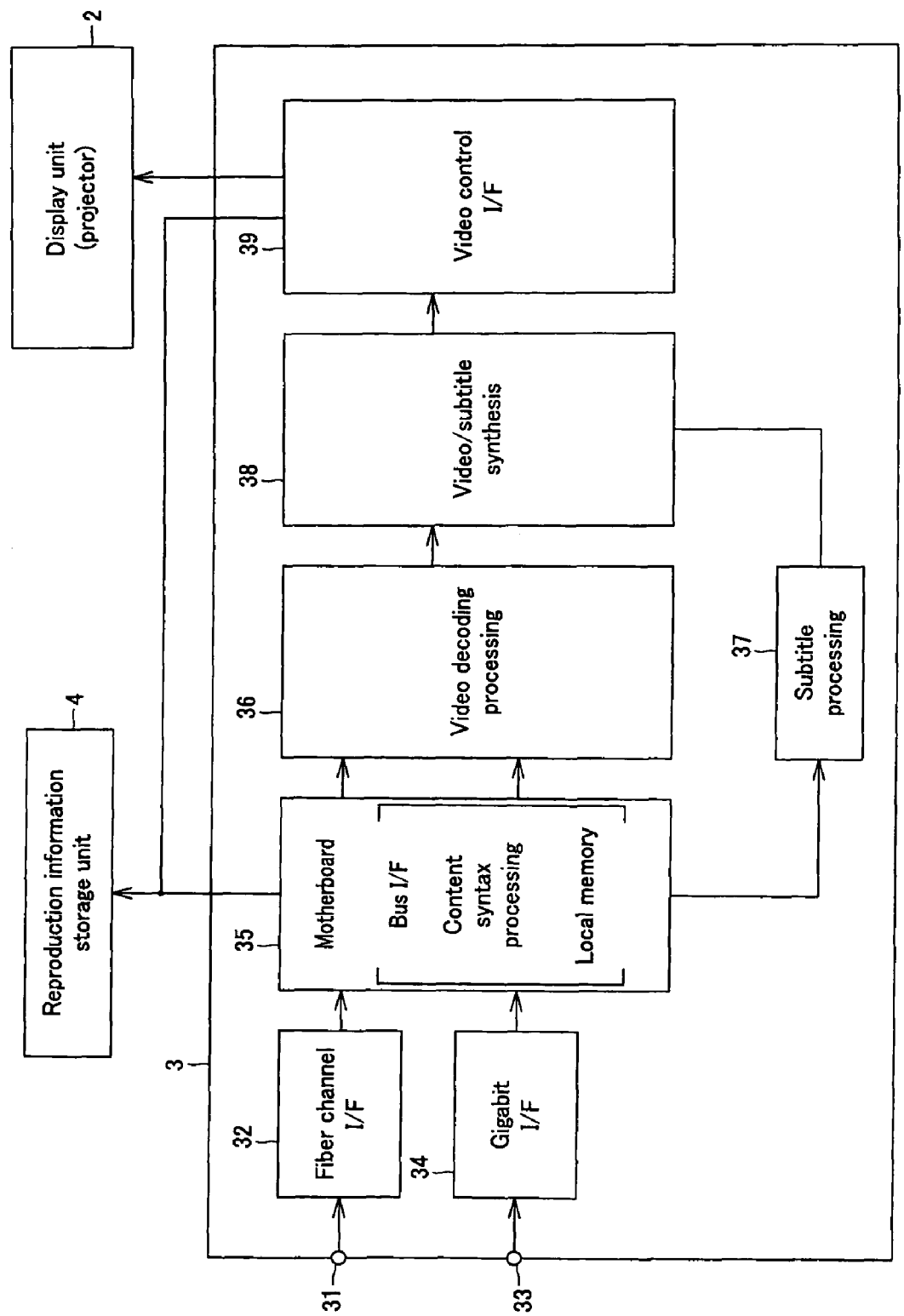
FIG. 10 is a view showing a configuration of the digital video reproduction apparatus.

FIG. 10 shows a detailed configuration of the reproduction unit 3. Supplied to an input terminal 31 is an encrypted content file called Digital Cinema Package (DCP). The encrypted content includes video/audio/subtitle data, etc., and is stored in the information storage unit 5 which is, e.g., an HDD. The video/audio/subtitle data are, of course, compressed. In particular, video data is encoded based on e.g., 97 files of JPEG 2000 (part 1). This encode method is not to perform compression by using a difference between frames but to perform compression within each frame. In this case, for example, the video data reproduced at 24 frames per second is compressed within each frame. The resolution of the video data is 4 k or 2 k.

This encrypted content file is received by a fiber channel I/F 32 at, e.g., 20 Gbps and is then input to a motherboard (M/B) 35. Supplied from the reproduction operation unit 6 to an input terminal 33 is an encryption key or control signal. The encryption key or control signal is received by a gigabit I/F and is then input to the motherboard (M/B) 35.

The motherboard 35 receives the encrypted content file including video/audio/subtitle data via a bus I/F and sends it to a content syntax processing section. The content syntax processing section decomposes the content file into video data, audio data, and subtitle file according to the syntax of the content, e.g., syntax based on an XML or MXF. At this time, the content syntax processing section may extract or generate reproduction information related to reproduced video information in some cases. The motherboard 35 includes: a local memory; a decryption section for decrypting encrypted content; a CPU for signal control which controls a video decoding processing section 36, an audio decoding processing section, a subtitle processing section (which are to be described later); and a main memory. The video data decomposed in the content syntax processing section is subjected to decryption in the decryption section and is supplied to the video decoding processing section 36. The subtitle file is supplied to the subtitle processing section 37. The audio data is supplied to a not-shown audio decoding unit.

The video decoding processing section 36 decodes the video data having a resolution of 4 k or 2 k based on e.g., 97 files of JPEG 2000 (part 1).

Figure 11:
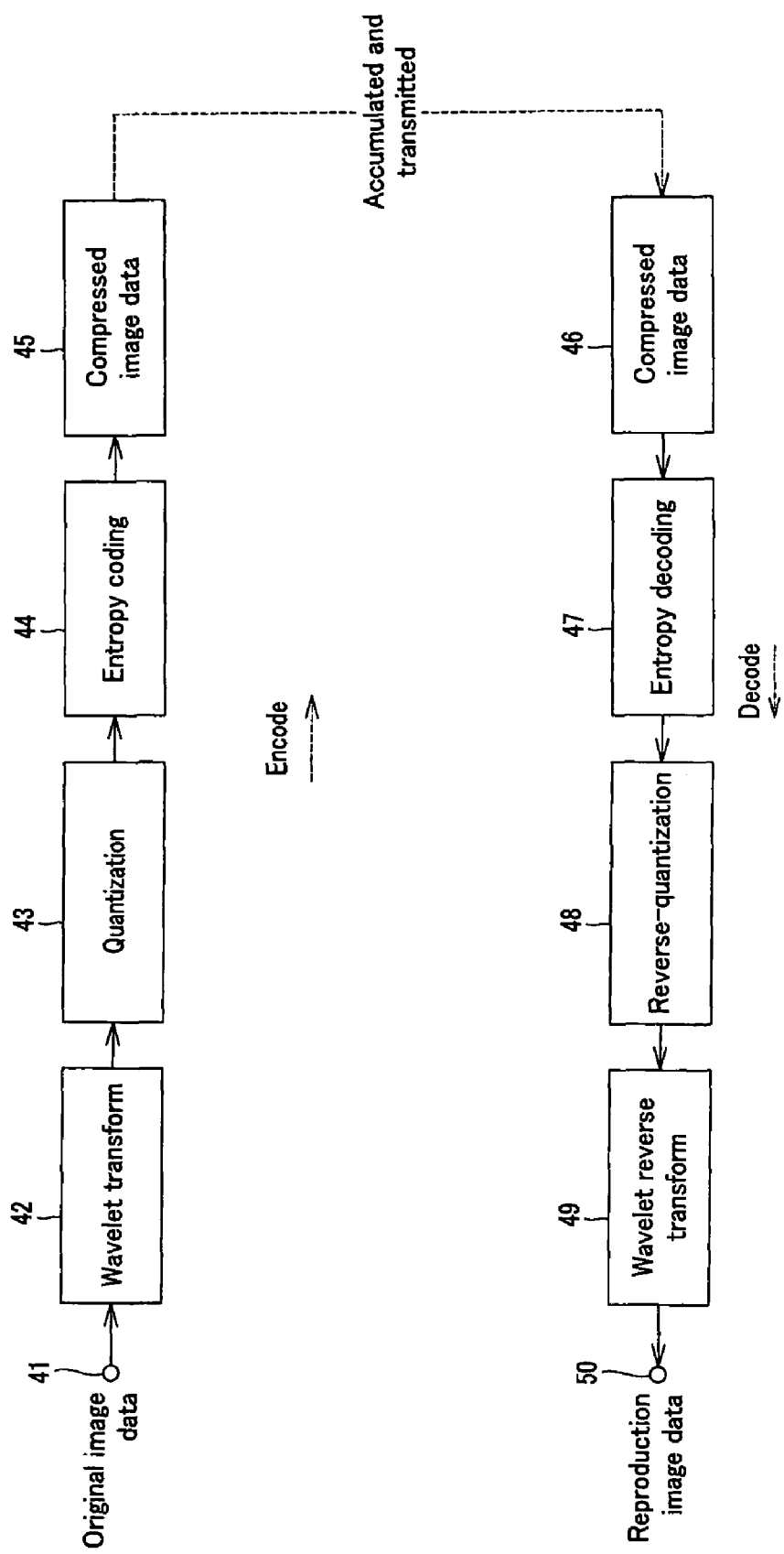
FIG. 11 is a view concretely showing a configuration example of a video decoding processing section.

FIG. 11 is a view showing an encode/decode process according to JPEG 2000 (part 1). In the encode process, a wavelet transform 42 is applied to original image data from the input terminal 41. After that, a quantization 43 and an entropy coding 44 are applied to the resultant image to generate compressed image data 45. In the decode process, the reverse processing to the encode process is performed. That is, an entropy decoding 47 is applied to accumulated or transmitted compressed image data 46. The resultant image is then subjected to a reverse-quantization 48 and a wavelet reverse transform 49. The obtained reproduction image data is output from an output terminal 50. The video decoding processing section 36 performs the decode process shown in FIG. 11.

The subtitle processing section 37 stores subtitle data decomposed by the content syntax processing section of the motherboard 35 in an internal subtitle memory and then transfers the subtitle data and a font file to the main memory to thereby notify the CPU for signal control of the motherboard 35 of completion of preparation for screening. The CPU for signal control then notifies the reproduction operation unit 6 that it has received the notification of completion of preparation for screening from the motherboard 35.

The reproduction operation unit 6 sends a control signal to start screening to the reproduction unit 3 via the gigabit I/F 34. Then the video decoding processing section 36 decodes the decomposed and decrypted video data based on the JPEG 2000 and supplies the decoded video data to a buffer memory 38 for video/subtitle synthesis. At the same time, still image data or text data obtained through graphic processing performed by a subtitle processing processor of the subtitle processing section 37 is supplied to the video/subtitle synthesis processing section 38. The video/subtitle synthesis processing section 38 synthesizes the image data output from the video decoding processing section 36 and still image data/text data from the subtitle processing section 37 and sends the synthesized data to a video control I/F 39. The video control I/F 39 sends the synthesized video image data to the display unit (projector) 2. The display unit 2 displays the video image data on a screen.

At this time, the reproduction unit 3 generates auxiliary information related to the reproduced video information in, e.g., the video control I/F 39 and writes it in the reproduction information storage unit 4. Further, as described above, the content syntax processing section in the motherboard 35 extracts or generates the auxiliary information related to the reproduced video information. As a matter of course, the reproduction unit 3 may generate the auxiliary information in any other internal block.

As described above, the digital video reproduction apparatus 1 according to the embodiment of the present invention uses the reproduction unit 3 to reproduce video information while storing auxiliary information related to reproduced video information in the reproduction information storage unit 4. At the time when, for example, a system has recovered from unexpected power interruption, the reproduction unit 3 reads out auxiliary information related to reproduced video information from the reproduction information storage unit 4, acquires offset information based on the read out reproduced video information, and determines a reproduction resuming position according to the offset information. Therefore, it is possible to resume reproduction not only from the top position or stop position but also from an arbitrary position.

Further, according to the digital video reproduction apparatus 1, remote control can be established between the reproduction operation unit 6 and reproduction unit 3, allowing the operator to determine a reproduction resume sequence even when the reproduction operation unit 6 is located away from the reproduction unit 3.

Further, according to the digital video reproduction apparatus 1, it is possible to select whether reproduction can promptly be resumed or not after a system has recovered from unexpected power interruption. In the case where reproduction is not promptly be resumed, adaptive reproduction resume can be performed based on a request of a viewer.

Figure 12:
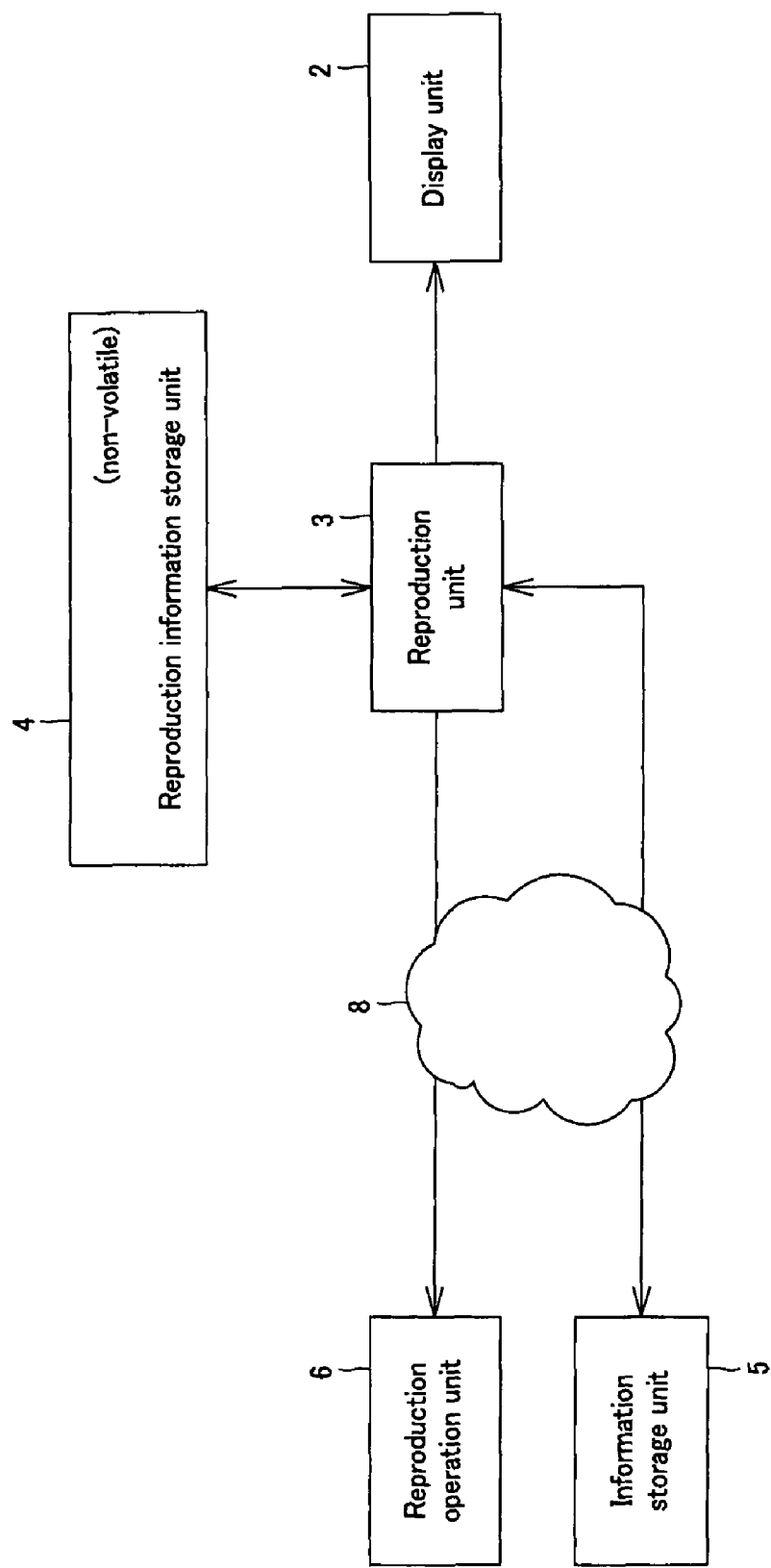
FIG. 12 is a view showing a configuration example of the digital video reproduction apparatus utilizing a network.

As another embodiment, a digital video reproduction apparatus 7 as shown in FIG. 12 can be employed, in which the reproduction operation unit 6 and information storage unit 5 are connected to the reproduction unit 3 via a network 8. This configuration allows remote control using, e.g., a LAN, Internet, or the like, making it possible for the operator to determine a reproduction resume sequence even when he or she is away from the reproduction unit 3.

It should be understood by those skilled in the art that various modifications, combinations, sub-combinations and alternations may occur depending on design requirements and other factors insofar as they are within the scope of the appended claims or the equivalents thereof.

What is claimed is:

1. A video reproduction apparatus which reproduces a reproduction video to be displayed on a display section under an environment where many people enjoy viewing video pictures to transmit the reproduction video to the display section, comprising:

an information storage section which stores video information corresponding to one or more titles in the form of a plurality of files having different data amount from one another;

a reproduction section which reproduces video information stored, in the form of a plurality of files, in the information storage section; and a reproduction information storage section which stores reproduction information which is auxiliary information related to reproduced video information that has been reproduced by the reproduction section; wherein the reproduction section refers to a plurality of offset information which are included in the reproduction information stored in the reproduction information storage section and which are appended for separating the video information within each file to determine a reproduction resuming position on video information, wherein, when performing resume reproduction, the reproduction section:

opens a file based on a current Reel number read out from the reproduction information storage section, refers to the plurality of offset information which are appended for separating the video information within each file based on a transfer amount read out from the reproduction information storage section, performs seek by the amount required for performing the resume reproduction, and reproduces the video information, and wherein there is available user set information related to automatic restoration, which indicates whether the automatic restoration is performed or not, as the reproduction information, and when the automatic restoration is not specified in the user set information, the reproduction section resumes reproduction under the control of an externally connected reproduction operation section.

2. The video reproduction apparatus according to claim 1, wherein the reproduction section reads out, as the reproduction information, a file name of a file that was being reproduced and a frame number of a separate section that was being reproduced from the reproduction information storage section and acquires offset information based on the file name and frame number to determine the reproduction resuming position on the video information.

3. The video reproduction apparatus according to claim 2, wherein the reproduction section rounds down the offset information to acquire the top position of the video information frame and determines the acquired top position as the reproduction resuming position.

4. The video reproduction apparatus according to claim 1, wherein there is available user set information related to automatic restoration, which indicates whether the automatic restoration is performed or not, as the reproduction information, and when the automatic restoration is specified in the user set information, the reproduction section performs resume reproduction.

5. The video reproduction apparatus according to claim 1, wherein the reproduction section notifies the reproduction operation section of the reproduction information, and the reproduction operation section determines whether reproduction can promptly be resumed or not based on the reproduction information, allows the reproduction section to perform the resume reproduction if reproduction can promptly be resumed, and allows the reproduction section to perform a manual resume reproduction process if reproduction cannot promptly be resumed.

6. The video reproduction apparatus according to claim 5, wherein the reproduction section performs the manual resume reproduction process while returning a response to the reproduction operation section in response to reproduction start position and content information notified from the reproduction operation section and notifying the reproduction operation section of status information.

* * * * *